March 4, 1969

J. R. LONG 3,430,986

ANTI-JACKKNIFE DEVICE FOR FIFTH-WHEEL
TRACTOR-TRAILER CONNECTIONS

Filed June 27, 1967

John R. Long
INVENTOR

BY

ATTORNEY

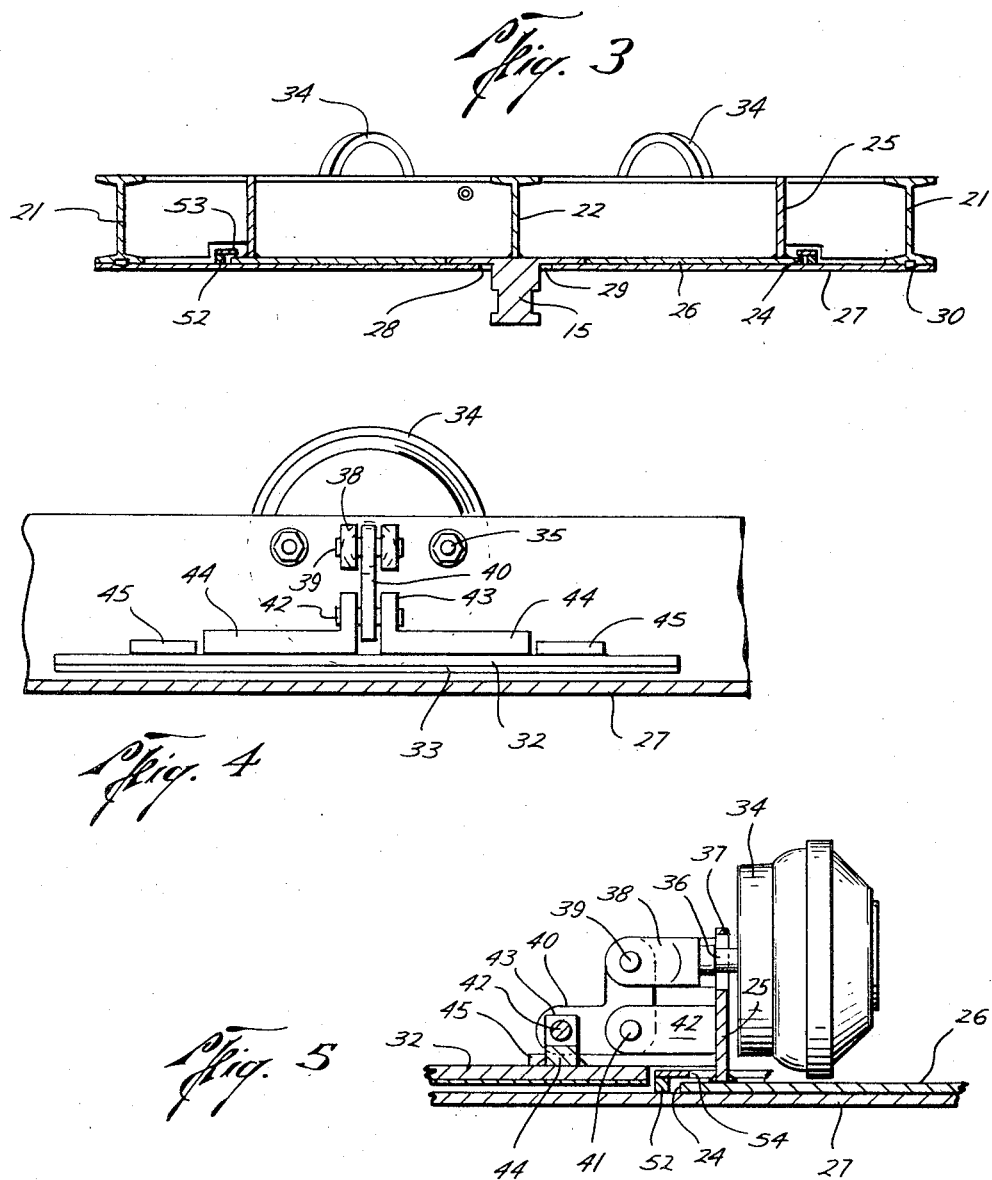

John R. Long
INVENTOR

BY

ATTORNEY

United States Patent Office 3,430,986
Patented Mar. 4, 1969

3,430,986
ANTI-JACKKNIFE DEVICE FOR FIFTH-WHEEL
TRACTOR-TRAILER CONNECTIONS
John R. Long, 1529 E. Park Lane,
Pasadena, Tex. 77502
Filed June 27, 1967, Ser. No. 649,188
U.S. Cl. 280—432                       8 Claims
Int. Cl. B62d 13/00, 53/08

ABSTRACT OF THE DISCLOSURE

An anti-jackknife device for fifth-wheel connections between a tractor and a trailer employing a brake connection for braking angular movement between the tractor and trailer. The device includes a king pin support attachable to the trailer, a clutch plate carried by the support engageable with the fifth-wheel for angular movement therewith about the king pin, and brake means engageable with the clutch plate in response to appropriate braking pressures to restrain said angular movement.

Background of the invention

"Jackknifing" is the term commonly applied to the swinging of a trailer out of the normal path of travel of the tractor to which it is connected as a result of various conditions encountered during travel of the vehicle, with frequently disastrous results, both to the tractor-trailer vehicle and to other traffic on the roadway.

Various means have been devised to overcome the jackknifing tendency of the trailer, without particularly satisfactory result. The anti-jackknifing structures heretofore proposed ordinarily require modification by one arrangement or another of the structure of the fifth wheel itself, which results both in a relatively complicated structure with attendant problems in connecting the trailer to the tractor, as well as causing problems in maintenance of the structure, and of its efficiency in overcoming the jackknifing tendency.

Summary of the invention

The present invention is directed to an improved device which is carried in its entirety by the trailer or semi-trailer, as the case may be, and is arranged to be connected to the fifth wheel on the tractor, without requiring any changes or modification in the conventional fifth wheel construction.

In accordance with the preferred embodiment of the present invention, the structure comprises a support or a frame, generally rectangular in shape, to be securely mounted beneath the forward end of the trailer and to which is connected the usual king pin. Mounted for rotation or angular movement about the king pin is a clutch or brake plate, from the underside of which projects a key or lug means shaped to be received in close fitting engagement in the fifth wheel slot following the king pin therein during coupling of the trailer to the tractor. Mounted on the support are brake means actuatable by fluid pressure and including large area flat-surfaced brake shoes disposed to engage the upper surface of the clutch plate in response to pre-determined braking pressure, whereby to provide strong braking force against angular movement of the trailer relative to the tractor.

With the described device, the clutch plate, which is generally circular, is free to swing with the fifth wheel angularly about the king pin during normal operation of the tractor-trailer unit, such as commonly occurs under normal driving conditions. When an emergency condition arises requiring application of the fifth wheel brake, the structure herein contemplated permits application of braking pressure over a very extensive braking surface defined by the upper face of the clutch plate and the co-operating brake shoes, thereby assuring a strong and rapid braking action sufficient to prevent any serious jackknifing between the vehicle sections.

Accordingly, it is a primary object of this invention to provide an improved anti-jackknifing braking device employing a braking structure carried in its entirety by the trailer, and which is relatively simple and highly efficient in its braking action upon the fifth wheel.

Other and more specific objects and advantages of this invention will become more readily apparent from the following detailed description when read in conjunction with the accompanying drawing which illustrates a useful embodiment in accordance with this invention.

In the drawing:

FIG. 3 is a cross-sectional view taken generally along line 3—3 of FIG. 2;

FIGS. 4 and 5 are fragmentary views illustrating some of the details of the braking elements of the device;

Figure 1:
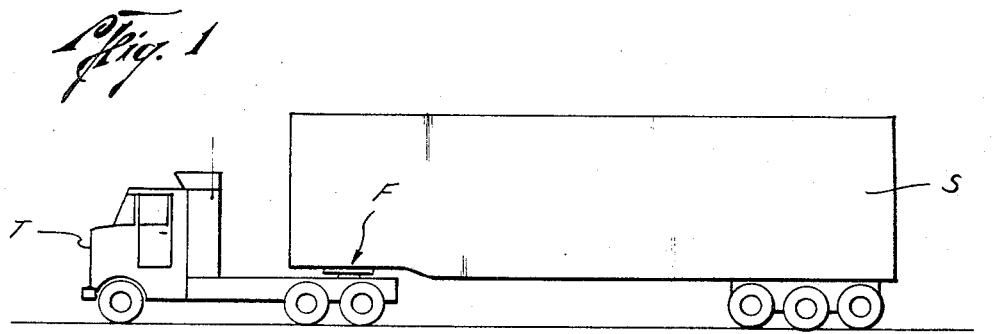
FIG. 1 is a side, elevational view of a conventional tractor-semi-trailer combination diagrammatically illustrating the fifth wheel connection between the vehicle elements.
Figure 6:
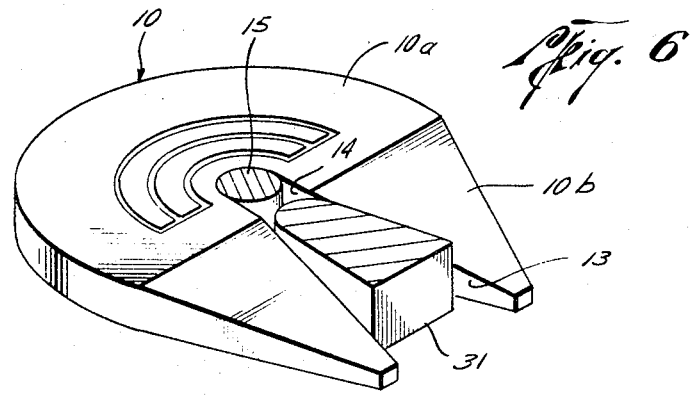
FIG. 6 is a perspective view illustrating some of the details of the connection to the fifth wheel.
Figure 7:
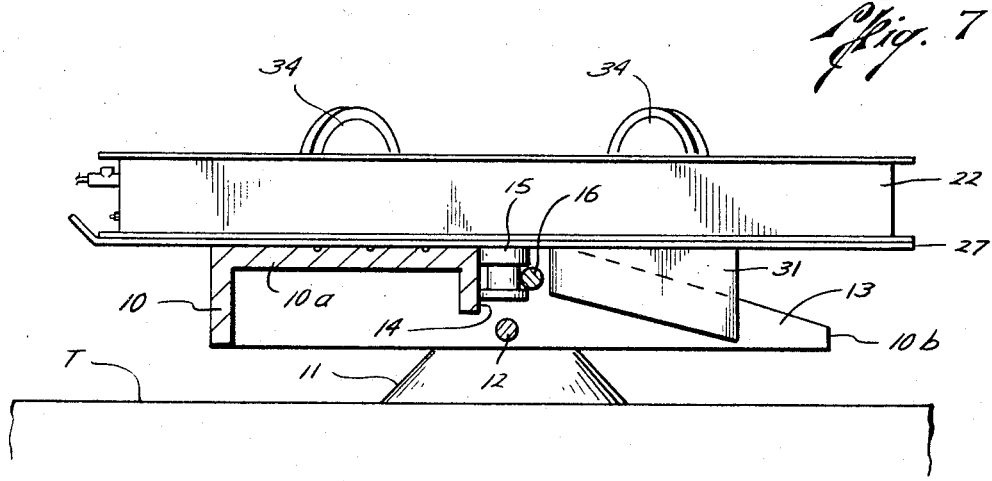
FIG. 7 is a cross-sectional view taken generally along line 7—7 of FIG. 3.

Referring to the drawing:

As seen in FIG. 1, a tractor T and a semi-trailer S, of conventional construction, are shown connected together by means of a fifth wheel connection, designated generally by the letter "F." The fifth wheel 10, as seen particularly in FIGS. 6 and 7, is of the conventional shape comprising a semi-circular forward segment 10a and an elongate tail segment 10b. The fifth wheel is mounted on an upwardly tapering base 11 mounted on the bed of tractor T, the fifth wheel being pivoted for movement about a horizontal axis extending transversely of the tractor, as provided by the pivot shaft 12. Fifth wheel 10 also has the usual inwardly tapering, generally triangular slot 13 which opens from the rear of tail segment 10b to about the center of segment 10a, there defining the semi-cylindrical recess 14 for receiving the king pin 15, and also carrying therein the usual keeper 16. The details of the latter are not shown since it may be any generally conventional design and forms no part of the present invention.

The anti-jackknife structure comprises a rectangular support or frame 20, preferably square, constructed of structural steel members, such as I-beams 21 securely connected together at the corners to form the frame, which is attachable in any suitable manner to the under carriage or frame (not shown) of the trailer at a point adjacent its forward end. A pair of cross members 22, likewise formed of structural steel shape such as I-beams, are disposed at right angles across the frame and at their intersection in the center of the frame the king pin 15 will be ridigly secured, as best seen in FIGS. 3 and 7. The bottom of the frame is covered by a base plate 23 rigidly secured to the frame members and provided with an annular slot 24 of substantial width to provide an opening therethrough for purposes to be described hereinafter, and defining a circular central plate portion 26.

Figure 8:
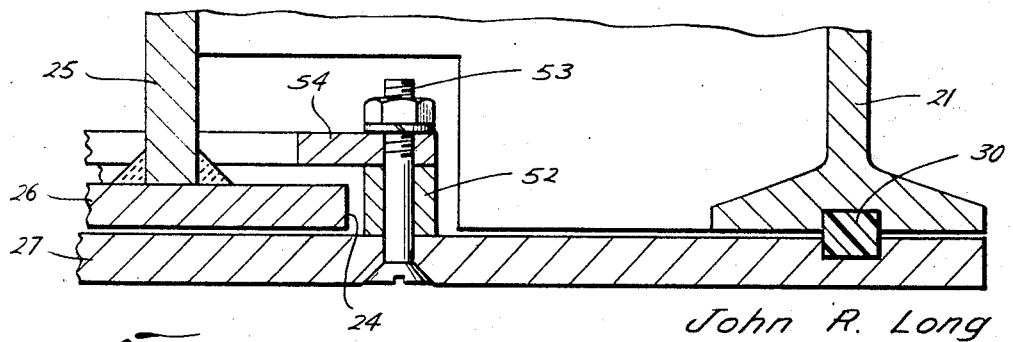
FIG. 8 is an enlarged sectional view showing a detail of the structure.

An upstanding steel ring 25 is rigidly secured to the central portion 26 of plate 23 adjacent the outer edge thereof which defines the inner edge of slot 24. A circular brake or clutch plate 27 is mounted beneath and closely adjacent base plate 23 and center section 26 and has a diameter substantially equal to the diameter of the outer periphery of slot 24. Clutch plate 27 is provided with a central opening 28 through which king pin 15 extends and is arranged for rotation about the king pin. An anti-friction bearing 29, of any suitable design, will be mounted in opening 28 about king pin 15. Additional anti-friction bearings 30 are disposed between the bottom portions of frame members 21 and the registering peripheral portion of clutch plate 27, as best seen in FIGS. 3 and 8, to reduce friction between the clutch plate and the frame during the angular oscillations which occur during normal operation of the tractor-trailer.

A lug member or key 31, of generally triangular configuration in horizontal cross-section dimensioned to slide snugly into fifth wheel slot 13, is mounted securely to the lower surface of clutch, plate 27 rearwardly of king pin 15. Lug 31, while illustrated as of hollow box-like configuration, may be a solid metal structure or may comprise a plurality of large steel pins secured to clutch plate 27 to define a generally triangular configuration and disposed so as to be slidably received in slot 13 in close engagement with the walls thereof. Various other forms of such a lug or key may, of course, be employed, the purpose of such a key being to closely connect clutch plate 27 to fifth wheel 10, so that the clutch plate will ordinarily swing freely with the fifth wheel relative to the trailer about king pin 15.

The portion of the upper surface of clutch plate 27, which is exposed within slot 24, defines an annular braking surface of substantial width and area. A plurality of flat brake shoes 32 of arcuate shape and having a width slightly less than the width of slot 24 and of substantial arcuate length, are pivotally mounted to ring 25 for downward movement against the upper surface of clutch plate 27 in effecting braking action therein. Shoes 32 are provided on their lower faces with brake lining 33 of any suitable and generally conventional form. In the illustrative embodiment, four such brake shoes are shown symmetrically disposed about the axis of the king pin and it will be understood that a greater or lesser number may be employed. However, in every case, the braking area provided by the shoes and clutch plate 27 will be made sufficiently large to assure that strong braking forces will be available when required. By the employment of the horizontal, large area braking surfaces in the arrangement illustrated, it is possible to develop very strong braking forces with a relatively small amount of pressure.

Figure 2:
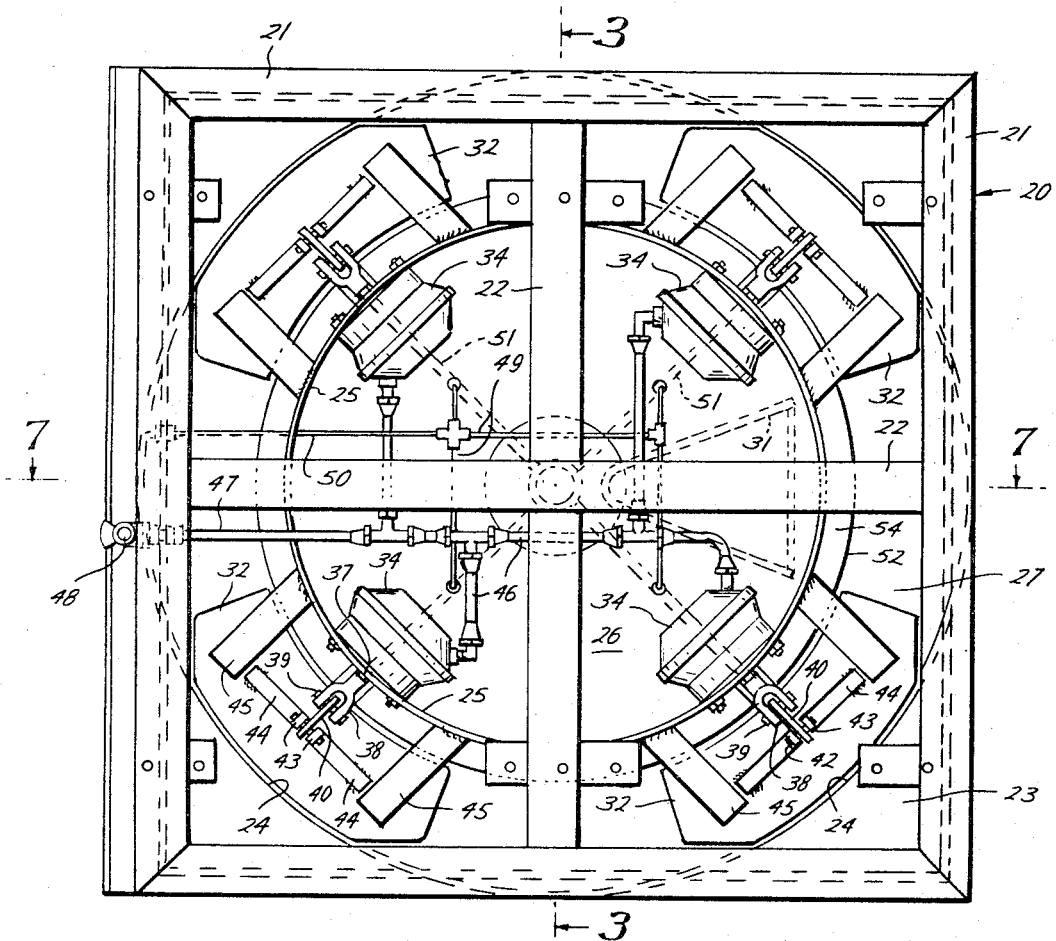
FIG. 2 is a top plan view of the anti-jackknife structure in accordance with this invention.

The means for actuating each of the brake shoes include a brake cylinder 34, of conventional design adapted to be actuated by fluid pressure, which may be either hydraulic or pneumatic. The brake cylinders, as best seen in FIG. 2, are securely mounted to the inner side of ring 25 by means of bolts 35 (FIG. 4), and each drives a shaft 36 extending through an opening 37 in ring 25 and carries a clevis or fork 38 which is pivotally connected, by means of a pivot pin 39, to one end of a bell crank lever 40, the center of which is pivoted by means of a pivot pin 41 between a pair of lugs 42 rigidly secured to the forward face of ring 25. The other end of bell crank lever 40 is pivoted by means of a transverse pivot 42 between a pair of upstanding ears 43 formed on brackets 44 mounted on the upper face of brake shoe 32. Lateral movement of each of the brake shoes is limited by pairs of stop plates 45—45 secured to ring 25 and projecting outwardly therefrom adjacent the opposite ends of the brackets 44. By means of the linkage between cylinders 34 and brake shoes 32, it will be clear that by forward movement of shafts 36 in response to fluid pressure in the cylinders, brake shoes 32 will be urged downwardly against the upper surface of the annular portion of clutch plate 27 which is exposed in slot 24. Retraction of shafts 36 will, of course, retract the brake shoes and release the clutch plate.

A piping manifold 46 is mounted within frame 20 and connects the several brake cylinders 34 to a supply pipe 47 which extends to the exterior of frame 20 and is fitted with a valve 48 for connection to the pressure fluid supply of the regular tractor-trailer brake system. The details of such system, which is generally conventional, do not form a part of this invention and it will be understood that such system will include conventional regulators commonly employed for emergency operations arranged to prevent actuation of the anti-jackknife brake until some pre-determined braking pressure is exceeded, whereupon the excess pressure will be transmitted to brake cylinders 34 for actuation of the anti-jackknife brakes.

If desired a separate hand-operated control and independent pressure fluid system may also be employed for actuatin gthe anti-jackknife brake.

A lubrication piping manifold 49 is also mounted in frame 20 and communicates a lubricant supply pipe 50, leading to the exterior of frame 20, with a plurality of lubricant channels 51 formed on the under side of center plate 26 for distributing lubricant between the under surface of the latter and the adjacent portion of the upper surface of clutch plate 27. A ring 52 is mounted by means of bolts 53 (FIG. 8) on the top surface of clutch plate 27 adjacent the outer edge of center plate 26 and has a flange 54 on its upper end extending over the outer edge of center plate 26. Ring 52 functions as a dam to prevent movement of lubricant from beneath center plate 26 onto the portion of the upper surface of clutch plate 27 which serves as a braking surface. Flange 54 holds clutch plate 27 in assembled relation to the supporting frame and may be removed upon removal of bolts 53 to drop the clutch plate from the assembly when required.

From the foregoing, it will be evident that the device described provides a braking unit mounted in its entirety on the trailer element, thus requiring no modification of conventional fifth wheels, with the result that trailers so equipped can be coupled to any tractor carrying the ordinary fifth wheel, the connection being made in the ordinary manner.

By means of the described brake arrangement, large area braking surfaces are provided which will, therefore, require a relatively small unit braking force to exert large braking action. Thus, a high degree of sensitivity will be available to the controls employed and thereby assures rapid and efficient anti-jackknife braking action in emergency situations.

What I claim and desire to secure by Letters Patent is:

1. An anti-jackknife device for fifth-wheel connections between a tractor and a trailer, comprising,
   (a) a support member attachable beneath the forward end of a trailer,
   (b) a king pin depending from said support member,
   (c) a clutch plate defining a plane upper surface horizontally disposed beneath said support member for angular movement about said king pin,
   (d) key means carried by the clutch plate arranged to follow the king pin into the king pin-receiving slot of a fifth wheel and adapted to closely engage the walls of said slot whereby to lock said clutch plate to the fifth wheel for angular movement therewith about the king pin,
   (e) brake means mounted to said support for movement into and out of braking engagement with said upper surface of said clutch plate, and
   (f) fluid pressure means for actuating said brake means.

2. A device according to claim 1, wherein said key means comprises a body having a frusto-conical configuration in plan corresponding in shape to said fifth wheel slot.

3. A device according to claim 1, wherein said brake means include a plurality of brake shoes angularly spaced apart about the axis of the king pin, each of said brake shoes comprising a horizontally disposed arcuate body having a flat under-surface carrying brake lining.

4. A device according to claim 3, wherein said fluid pressupre means includes fluid pressure-actuatable brake cylinders operatively connected to said brake shoes.

5. A device according to claim 1, wherein said support member includes:
   (a) a generally rectangular structural frame,
   (b) plate means secured to the underside of said frame, and
   (c) an annular slot in said plate means concentric with the axis of said king pin exposing a correspondingly shaped area of said plan upper surface of said clutch plate for engagement by said brake means.

6. A device according to claim 5, including:
   (a) an upstanding annular flange mounted on said plate means concentric with and adjacent the inner edge of said slot, and wherein
   (b) said brake means includes:
      (i) brake cylinders mounted on said flange,
      (ii) brake shoes positioned over said slot for vertical movement relative to the upper surface of said clutch plate,
      (iii) operating linkages connecting said brake cylinders to said brake shoes, and
      (iv) means for supplying actuating fluid to said brake cylinders.

7. A device according to claim 1 having anti-friction bearing means arranged between said support and said clutch plate.

8. A device according to claim 7 having anti-friction bearing means arranged between said clutch plate and said king pin.

References Cited

UNITED STATES PATENTS

| | | | |
|---|---|---|---|
| 2,613,946 | 10/1952 | Anderson et al. | 280—432 |
| 3,036,845 | 5/1962 | Till | 280—432 |
| 3,328,051 | 6/1967 | Hope | 280—432 |

LEO FRIAGLIA, *Primary Examiner.*